(12) United States Patent
Franke et al.

(10) Patent No.: US 10,251,462 B2
(45) Date of Patent: Apr. 9, 2019

(54) HAIR CONSULTATION TOOL ARRANGEMENT AND METHOD

(71) Applicant: Noxell Corporation, Hunt Valley, MD (US)

(72) Inventors: Michael Franke, Darmstadt (DE); Dieter Hans Josef Langsch, Darmstadt (DE); Marika Markobasic, Seeheim-Jugenheim (DE); Oliver Von Sartori-Montecroce, Kronberg (DE)

(73) Assignee: Noxell Corporation, Hunt Valley, MD (US)

( * ) Notice: Subject to any disclaimer, the term of this patent is extended or adjusted under 35 U.S.C. 154(b) by 199 days.

(21) Appl. No.: 14/258,900

(22) Filed: Apr. 22, 2014

(65) Prior Publication Data

US 2014/0313302 A1    Oct. 23, 2014

(30) Foreign Application Priority Data

Apr. 23, 2013  (EP) ..................................... 13164819
Apr. 23, 2013  (EP) ..................................... 13164821

(51) Int. Cl.
*A45D 44/00* (2006.01)
*G03B 15/02* (2006.01)
*H04N 5/272* (2006.01)

(52) U.S. Cl.
CPC ............ *A45D 44/005* (2013.01); *G03B 15/02* (2013.01); *H04N 2005/2726* (2013.01)

(58) Field of Classification Search
CPC ......... A45D 44/005; H04N 2005/2726; G03B 15/02
See application file for complete search history.

(56) References Cited

U.S. PATENT DOCUMENTS 6,719,565 B1   4/2004  Yoshimichi
8,432,458 B2   4/2013  Hirooka
(Continued)

FOREIGN PATENT DOCUMENTS

EP   1857015 A1   11/2007
EP   2583537 A1   4/2013
(Continued)

OTHER PUBLICATIONS

"Canadian Application Serial No. 2,907,718, Office Action dated Sep. 28, 2016", 4 pgs.
(Continued)

*Primary Examiner* — Dave Czekaj
*Assistant Examiner* — Berteau Joisil
(74) *Attorney, Agent, or Firm* — Schwegman Lundberg & Woessner, P.A.

(57) ABSTRACT

A hair consultation tool arrangement is disclosed comprising a digital video camera (2) adapted for continuously taking pictures of a model's head and hair (3), a processing unit (4) having a camera interface for collecting pictures recorded by the digital video camera (2), a processor with an image processing software tool implemented for processing the collected pictures and a display interface for sending the processed pictures (6) to a display device (5), and a display device (5) for presenting the processed pictures (6). The hair consultation tool arrangement (1) comprises an illumination device (8) directed towards the model's head and hair (3) for illuminating the part of the model (3) imaged by the digital video camera (2).

22 Claims, 2 Drawing Sheets

(56) References Cited

U.S. PATENT DOCUMENTS

| | | | | |
|---|---|---|---|---|
| 2004/0239689 | A1* | 12/2004 | Fertig | A45D 44/005 345/641 |
| 2010/0128939 | A1* | 5/2010 | Stubler | G06K 9/00281 382/118 |
| 2011/0129210 | A1* | 6/2011 | McGucken | F16M 13/02 396/422 |
| 2012/0160260 | A1 | 6/2012 | Rolston | |
| 2013/0088154 | A1* | 4/2013 | Van Hoof | H05B 37/02 315/152 |

FOREIGN PATENT DOCUMENTS

| | | | |
|---|---|---|---|
| JP | 2001100303 | A | 4/2001 |
| JP | 2006109861 | A | 4/2006 |
| JP | 2010028596 | A | 2/2010 |
| JP | 2012005110 | A | 1/2012 |
| JP | 2016510728 | | 4/2016 |
| JP | 2016524363 | A | 8/2016 |
| JP | 6224822 | | 11/2017 |
| WO | WO-2006132686 | A2 | 12/2006 |
| WO | WO-2011158143 | A1 | 12/2011 |
| WO | WO-2014176215 | A3 | 10/2014 |

OTHER PUBLICATIONS

"Canadian Application Serial No. 2,907,718, Response filed Mar. 28, 2017 to Office Action dated Sep. 28, 2016", 18 pgs.

"European Application Serial No. 13164819.8, Extended European Search Report dated Sep. 23, 2013", 6 pgs.

"European Application Serial No. 13164821.4, Extended European Search Report dated Sep. 23, 2013", 6 pgs.

"European Application Serial No. 14725341.3, Response filed May 24, 2016 to Communication pursuant to Rules 161(1) and 162 EPC dated Dec. 1, 2015", 6 pgs.

"International Application Serial No. PCT/US2014/034915, International Preliminary Report on Patentability dated Nov. 5, 2015", 8 pgs.

"International Application Serial No. PCT/US2014/034915, International Search Report dated Dec. 8, 2014", 3 pgs.

"International Application Serial No. PCT/US2014/034915, Written Opinion dated Dec. 8, 2014", 6 pgs.

"Japanese Application Serial No. 2016-510728, Office Action dated Apr. 4, 2017", 4 pgs.

"Japanese Application Serial No. 2016-510728, Office Action dated Nov. 15, 2016", 5 pgs.

"Japanese Application Serial No. 2016510728, Response filed Mar. 3, 2017 to Office Action dated Nov. 15, 2016", 13 pgs.

"Canadian Application Serial No. 2,907,718, Office Action dated Nov. 2, 2017", 4 pgs.

"Japanese Application Serial No. 2016-510728, Appeal Decision dated Sep. 12, 2017", 3 pgs.

"Japanese Application Serial No. 2016-510728, Office Action dated Apr. 4, 2017", (w/ English Translation), 8 pgs.

"Japanese Application Serial No. 2016-510728, Office Action dated Nov. 15, 2016", (w/ English Translation), 9 pgs.

"Japanese Application Serial No. 2016-510728, Response filed Aug. 4, 2017 to Office Action dated Apr. 4, 2017", 17 pgs.

"European Application Serial No. 14725341.3, Communication Pursuant to Article 94(3) EPC dated May 15, 2018", 6 pgs.

"European Application Serial No. 14725341.3, Response filed Aug. 29, 2018 to Communication Pursuant to Article 94(3) EPC dated May 15, 2018", w English Claims, 14 pgs.

"Japanese Application Serial No. 2017-151235, Office Action dated Sep. 18, 2018", w English translation, 4 pgs.

* cited by examiner

HAIR CONSULTATION TOOL ARRANGEMENT AND METHOD

FIELD OF THE INVENTION

The invention relates to a hair consultation tool arrangement comprising a digital video camera adapted for continuously taking pictures at least of the model's head and hair, the model being a human being or an artificial mannequin. Of course, the digital video camera might also take a broader view of the model, such as a portrait containing also the model's head and hair.

This tool arrangement comprises a processing unit having a camera interface for collecting pictures recorded by the digital video camera, a processor with an image processing software tool implemented for processing the collected pictures, a display interface for sending the processed pictures to a display device and a display device for presenting the pictures. Pictures in the sense of this invention do include both, still pictures also running pictures (movies) composed of a continuous sequence of recorded pictures. The hair consultation tool arrangement is particularly adapted to a hair color simulation. The invention further relates to a respective method and a computer program product.

In this text the indefinite article "a/an" shall have the meaning "at least one/one or more", if not specified contrarily.

BACKGROUND OF THE INVENTION

A method for hair color consultation is known, for instance, from the EP 1 147 722 A1, which uses a two-dimensional static digital portrait taken by a camera, in which desired hair style color is input selectively and shown on a display screen. However, such a result looks static and unnatural because the use of one single still picture cannot give a real live impression as if the customer looks into a mirror in which the customer is confronted with his/her new hair color combined with a genuine live facial expression.

US 2004/0239689 A1 is based on the one hand on a dynamic video image (movie) and on the other hand on a change in color of the natural hair of the person. The video image is prepared in real time and reproduced on a mirror-like screen in such a way that it is the impression of the customer to use a mirror, by using one device, onto which both the video camera and the display for presenting the processed pictures are installed. Thus, it is not possible that the user is able to view his/her hair as seen from the side or the rear of the head on the display, similar to a simple single mirror. Another drawback of the presented system is that the image processing is sometimes difficult because it is not easy to decide for the computer system software tool which part of the image is the hair region of the customer, the hair color of which has to be changed in order to present to the customer a realistic virtual image of a future hair coloring.

SUMMARY OF THE INVENTION

Accordingly, it is an object of the present invention to offer to the customer a more realistic image of the result of the hair coloring by means of continuous pictures (movie) having a better quality with regard to a natural look of the images and a better identification of the mask region of the hair.

This object is attained in accordance with the features of claim 1. With regard to the hair consultation tool arrangement as described above in the beginning, it is provided that the hair consultation tool arrangement comprises additionally an illumination device directed towards the model's head and hair for illuminating exactly this part of the model imaged by the digital video camera.

The use of such an illumination device has two major positive effects on the result of the hair consultation process, i.e. the presented processed pictures on the display. The first advantage is to have a light temperature predominantly defined, allowing for image calibration of the used display. In contrast, the current systems contain a white point balance providing a neutral image to the image processing unit. This enhances a more natural and pleasant image on the display device. The second advantage is to be able to control the illumination of the scene: more light on the head, being it the main area of interest, thus producing more shine; less light to the face making the persons appearance more pleasurable; enough diffuse light to avoid shadows on the face that would hinder the segmentation and image processing. This aspect is related to the fact that the hair and head region illuminated by the illumination device is brighter and the natural hair color and structure can be identified more precisely by the image processing software tool because the color temperature of the illumination device is defined and known to the image processing software tool. This allows a calibrated or more precise determination of the natural hair color. As the hair region is better illuminated the hair structure can be evaluated more precisely by the image processing software tool. This leads to a better masking of the hair region and thus to a better identification of the parts of the image to which the change in the color has to be performed. It is also easier for the image processing software to differentiate between color temperature value and brightness value in the image regions. Another aspect is related to the setup and calibration of the tool arrangement during which the exposure time for each picture recorded by the digital video camera, in particular depending on the model's natural hair color, is determined such that the texture of the image or the dynamic range of the light intensities of the camera records in the hair region of the model is in an optimum range for image processing. Due to the additional illumination, the range of possible combinations of aperture and exposure time of the recorded pictures is much broader and can be adjusted optimally. Generally, the brighter the object to be imaged by the video camera is, the shorter the exposure time of each picture can be chosen thus allowing a higher picture rate in the continuous picture sequence (movie) though the frame rate, of course, is not only limited by the exposure time.

In order to achieve high quality images, according to a preferred embodiment a HDR camera (High Dynamic Range) might be used. This HDR method is used to capture a higher dynamic range between the lightest and darkest areas of an image than current standard digital imaging methods or cameras. HDR cameras often take multiple pictures e.g. at different exposure times or with different responsivity (different ISO settings as a measure of sensor sensitivity to light) of the light sensor and stitch the different pictures together to produce a resulting image that is representative in both dark and bright areas. The several pictures are taken preferably in a very short sequence to have the utmost identical scene in all the pictures used for the HDR method. This is done by picture processing to imitate one HDR picture using more than one picture to be stitched, in particular two pictures. Each of the multiple pictures represents a optimum gradation of a selection from the total range of brightness of the scene, whereas each pictures chooses a different selection from the total range of brightness. Thus, optimum gradation can be simulated in the resulting picture for a higher range of brightness with respect to a single picture.

Alternatively some digital cameras can obtain a HDR image from a single image captured. A HDR image will preferably be recorded as at least a 12 bit image (image with 12 bit per channel). This might be achieved by different active areas used on the camera sensor for one picture point. The active areas might be built by different sensor pixels collecting the light for one picture point. For example, simultaneously two or more sensor pixels can be used to capture the light for one picture point. The processor of the camera then decides, how many of these sensor pixels are used for the one picture point, depending of the amount of light, i.e. the brightness, corresponding to that one picture point.

According to the invention, the illumination device comprises at least two different lighting modules, one of the lighting modules being a diffuse light module creating a diffuse light and the other of the at least two lighting modules being a spotlight module creating a spotlight. The spotlight module might in particular by a point light module having at least one point light source. Accordingly, the illumination of the model is preferably made of a mixture of diffuse light and spotlight. The diffuse light enhances the image segregation of certain image areas, i.e. the separation of the hair region being the region of interest according to the invention and other image areas, such as face or background. The spot (or specula) light is in particular used to provide a natural shine to the hair and to enhance a natural color to the skin. Accordingly, these two different lighting modules (diffuse and spot light module) according to the invention improve the image quality of the processed pictures.

To this aim it is preferred that at least one light source of the diffuse light module is positioned basically in the same plane with the video camera, said plane being directed according to a preferred embodiment basically perpendicular to the optical axis of the video camera. Further, it is advantageous that the diffuse light module might comprise at least two light sources, preferably three light sources and most preferably four light sources arranged around the digital video camera. According to a preferred arrangement of the light sources, all light sources of the diffuse light module can be arranged in the same plane, and in particular in the same plane with the digital video camera. Thus, the created diffuse light is directed towards the model in the same or a similar direction as the view direction of the digital camera thereby reducing disturbing shadows on the model's surface, i.e. the face and the hair of the model. A positive effect of the diffuse lighting is that the texture in the interesting image areas of the model is very good due to a light intensity in these regions being in a mid-range far away from the dark region (black) and a bright region (white) both showing no surface texture. In the mid-region of light intensity, the creative possibilities for the image processing software tool are optimal, e.g. for identifying and masking certain objects or regions in the pictures. Thus, the diffuse light module having one or preferably more than one light source enhances the identification of the hair region, the color of which is selectively to be changed by the hair consultation tool arrangement system while the other regions such as face and background shall remain unchanged in order to avoid not desired artifacts in the processed pictures. This leads to notably better quality of the processed pictures much closer to the natural look of a customer with the virtual hair color.

The light sources used in the diffuse light module might have an elongated form, such as tubular fluorescent tubes. The elongated form generates a distributed light emission along the elongation of the light sources abetting a diffuse light generation. Additionally, in line with the invention, the light sources might be covered by a diffuser, such as a translucent glass, in order to produce a high quality diffuse light with an almost equally distributed light intensity on the object of interest, i.e. the model's head and hair.

However, as pictures taken by a diffuse (technically optimum) light with regard to the technical requirements of the digital video camera seem often flat and uninteresting in an artistic assessment of the picture, the diffuse lighting can have the effect that the customers might not like the change of the hair color displayed as a resultant picture of the hair consultation tool arrangement and method because the general impression of the picture is not interesting and pleasant. In order to improve the plasticity of the processed picture, it is proposed according to the invention that also a spotlight module is provided creating a spotlight on the model and in particular on the model's head and hair. To that aim, a light source of the spotlight module is preferably disposed to light up the model's hair with a spotlight or point light. The light source might be adjustable to emit the spotlight cone in an angle between 0° and 90° with respect to the optical axis of the digital camera. This means that the light source of the spotlight is disposed in the space between the camera and the model with a certain distance to the optical axis such that the light source itself is not seen in the image. The light cone of the spotlight source is directed towards the model. If the optical axis of the camera and the middle axis of the light cone (light axis) are brought to an intersection (e.g. because they intersect each other in real or as they are shifted theoretically in parallel to intersect each other), the smaller angle between these axis is between 0° to 90°. This is meant by the before identified feature.

According more detailed definition of the relative disposal of the spotlight and the digital camera according to a preferred embodiment, it is provided that the light source is adjustable to emit the spot light cone with its light axis positioned in a azimuthal angle $\beta$ between 0° and 90° measured between a horizontal plane running through the model's head and hair and/or through the focal point of the digital camera and the light axis (i.e. the middle axis of the light cone) leading from said spotlight source (light source of said spotlight module) to said model's head and hair. The digital camera might be disposed with its optical axis disposed in the horizontal plane or in an azimuthal angle $\gamma$ with respect to the horizontal plane wherein $\gamma \leq \beta$. The azimuthal angles $\beta$, $\gamma$ shall be measured starting from the horizontal plane in the same direction which leads towards the space defined vertically above the horizontal plane.

The angle $\gamma$ is preferably chosen to be between 10° to 15°. The makes the model generally look more attractive.

Expressed less technically, the light source of the spot light module is disposed in the space between the camera and the model or—with respect to the model—behind the camera then having preferably a very reduced opening angle and directed towards the model. This is a situation of no backlighting. A preferred azimuthal angle $\beta$ is between 30° and 70°, and in particular between 35° and 65°.

Further, a polar angle $\alpha$ defined between the vertical plane including said optical axis and a vertical plane including said light axis is in a range between −45° to +45°. This means that the spotlight illuminates the model's head and hair from the front above the model's head and hair (preferred azimuthal angle β) and possibly in a certain angle in horizontal projection of said optical axis and said light axis. If the polar angle α is in a range between +15° to +45° or −15° to −45°, the light source of the spotlight is not positioned in the vertical plane including the optical axis, i.e. not vertically above the camera. This might increase the plasticity of the picture taken.

Preferably, the spotlight is lighting up the model's head and hair from the top (or more precisely top side) with respect to the optical axis of the video camera thus bringing a light brilliance to the hair region of the model being of most interest and enhancing the plasticity of the face by introducing some shadows in the mid brightness range to the model's face. In particular, in combination with the diffuse light module, it is avoided that the shadows produced by the spotlight are too strong and have a negative influence on the optical reception of the picture by the customer and the image processing ability. To this aim it might be advantageous that the area transcribed by the spot light described as the sum of the range (defined as a positive value) of the polar angles (α) and of the range (defined as a positive value) of the azimuthal angles (β), in which in particular more than 50% of the light intensity are emitted, is less than 10° to 20°. This ensures that the spotlight is limited in the range of the major intensity to the model's hair. This leads to a high plasticity of the hair in the pictures taken.

In this context, a backlighting of the model has to be avoided. Backlighting is defined as illumination of a light source located in space opposite to the digital video camera relative to the model. To this aim, the light source of the spotlight module might according to an embodiment of the present invention be attached to a hinged bracket which is fixed to a module carrying the digital camera (camera support) avoiding thus a positioning of the spotlight in a way to create a backlighting situation. In addition, the processing unit might be adapted—by respective software installed on the processor—to recognize a backlighting situation in the collected pictures by means of the image processing software tool and to send a warning message to the display interface for being displayed on the display device. This is a user friendly support helping to optimize the setup and calibration of the illumination module.

Besides the recognition of a backlighting situation, the processing unit might also be adapted to recognize by means of the image processing software tool in the recorded (and collected) pictures other effects not desired, such as a unpleasant shadow direction or a to low or high intensity of the spotlight, and might inform the user accordingly. Thus, a user is able to arrange the spotlight in a better (optimum) position to achieve the best quality available in the processed pictures.

The before mentioned lightening arrangements are in particular preferred in combination with the use of a HDR camera used as a digital video camera. In this configuration, the model's hair is very bright with respect in particular to the background and major parts of the face. This brightness can be used by the processor of the processing unit of the hair consultation tool arrangement when executing the proposed method to select this hair region as one selection with optimum gradation from the total range of brightness of the scene. This allows in a good manner to distinguish the hair form other parts of the picture. As a second region, the face (and/or background) can be selected for another region with optimum gradation. Thus, the two main interests of the picture can be created in the desired quality.

According to a further preferred embodiment of the invention, the light sources of the diffuse light module and/or the spotlight module might be daylight lamps and/or warm tone lamps. Preferably, the light source of the diffuse light module may be a cold white lamp (e.g. approximately 4000K between warm white and daylight white) enabling a good assessment of hair colors. The light source of the spotlight module might preferably be at the same color temperature as the diffuse light.

Further, the one, more or all light sources might be controllable by the processing unit, i.e. the processing unit might be adapted to switch on and off and/or to calibrate the light sources. Calibration might include control of the light intensity and/or the light temperature of the light sources, depending on the possibilities of adjustment of the different light sources used.

According to a further aspect, the invention offers the possibility of more different views of the customer's head and hair, and in particular also a rear view. To this aim, the display device may preferably be a portable display device connected to the display interface of the processing unit. Preferably, the display device of the processing interface is using a wireless communication, such as WLAN, Bluetooth or the like, for establishing data communication between the processing unit and the display device via the display interface. Of course, the processing unit might also be included into the portable display device. In such an embodiment the connection to the display interface of the processing unit is a connection using an internal display interface.

The use of the portable display device and preferably also of the wireless communication between an in particular external processing unit and the display device, allows free movement of the model (customer) before the video camera, e.g. a rotation of up to 360° (full rotation), while taking the display device with him or her such that the module views the processed pictures in each rotational position with respect to the video camera. Accordingly, the portable display is moved together with the model whiles displaying continuously the views of the model as seen by the fixed digital video camera. Thus, the mobile display rotated together with the model in front of this face creates in combination with the fixed digital video camera a virtual mirror allowing the model customer to see also the back of the head normally not accessible by a simple single mirror.

According to a preferred embodiment, the display device may comprise a display processor adapted—e.g. by a suited software installed on the display processor—to execute an application on the display device that is showing the processed image and allowing a user input or setup the system and/or to influence the processed image using input tools. The processor might also include the image processing software tool, in particular in case the processing unit and the display unit build one single integrated unit.

A preferred display device is a touch-screen display device, such as a tablet computer, allowing the installation of such applications easily. The input tools might be panels, buttons or the like presented on the display and selectable via the touch-screen.

According to a preferred embodiment, the touch-screen display device might allow as a user input (besides other input options) in particular a finger painting on the image of a picture taken by the camera and displayed on the touch-screen for selecting hair, skin and (if applicable) background areas in the image (in particular of the still picture). This is supporting the step of segmenting the hair in the displayed image.

Preferably, the finger painting is displayed on the touch screen such that areas selected by finger painting, i.e. by touching with and preferably also moving the finger on the touch screen in a zone of the touch screen where the image of the picture is displayed, are shown (highlighted) as a defined colors layered over the original image. The colors might be predefined as different colors for the selection of hair and skin and/or other areas respectively. In case that also background areas can be or are selected, the color of the area selected by finger painting might be the same color as used for the skin area or a color different from the colors of the highlighted hair and the skin areas. There might also be a separate user input, e.g. a button on the touch screen or other, for indicating that the finger painting performed after actuation of the separate user input will be a selection of a hair or skin (or background, if applicable) area.

If an area already is selected by finger painting and highlighted on the display with the respective color, it might be useful to deselect an area or parts of an area by simply touching selected areas again. Of course, there also might be a separate user input, e.g. a button on the touch screen or other, for indicating that the finger printing performed after actuation of the separate user input will be a deselection of previously selected areas.

The applications installed on the display device equipped with a display processor might also be used to initialize the hair consultation process including a calibration of the hair consultation tool arrangement (performed e.g. by the processing unit) and/or to control the hair consultation process. To this aim, the display device is sending respective commands to the processing unit via the display interface. The display device according to this preferred embodiment is accordingly acting as an input and control panel of the processing unit.

Of course, a processing unit can also be directly controlled by an input device connected to the processing unit, such as a key pad. Also a voice-controlled processing is possible, either directly or via a tablet unit providing e.g. also a combination of a voice and key pad control. Further, a monitor might be connected directly to the processing unit to allow an optical control of the input and the system. The processing unit might be a conventional desktop computer. The supervisor controlling the processing device with the keypad and the monitor might accordingly be a hair stylist or consultant. The same functionality, however, can be offered in an administrator mode of the application running on the display device. It is also possible that two display devices are connected in parallel to the processing unit, being a customer display device in the customer mode and a stylist display device in the administrator mode, the latter allowing e.g. a more detailed input of parameters for the hair consultation.

However, it is a major benefit of the proposed arrangement that it can be controlled simply by a customer display device only acting as input and control panel of the processing unit. This enhances the acceptance of the hair consultation tool arrangement in practice as the customer has the feeling to change the hair color on his or her own.

The process of the hair consultation will be described in detail in the following.

In order to execute the hair consultation, the processing unit of the hair consultation tool arrangement according to the invention might be adapted—e.g. by a suited software installed on the processor of the processing unit—to perform a hair color simulation in which the hair color of the model's hair is amended by replacing the natural hair color in the continuously collected pictures by a color determinable and determined by an user input. The resulting processed pictures are continuously presented on the display device.

Accordingly, the processor of the processing unit might be adapted—e.g. by a suited software installed on the processor—to perform at least a selection of the following steps:

Setting up and calibrating the illumination device and/or the camera device.

This step might include switching on the illumination device and the camera device, calibrating the intensity and/or color temperature of the light sources of the illumination devices and/or determining an exposure time of the digital video camera. The setting up might further include an automatic or manual positioning of the illumination device, in particular of the spotlight module.

Taking a still picture of the model and calibrating the still picture.

The still picture of the model is used for the preparation of the consultation process and the image processing of the continuously collected pictures. Accordingly, the sill picture might be image-processed in order to render the image real-like, e.g. by selectively altering the brightness of some areas of the face, e.g. the skin. In particular, darkening of the skin might be used for rendering it natural.

Segmenting the hair area from other image areas of the still picture, in particular the skin of the face and the background.

The selection of the hair area might be performed by an automatic selection through the image processing software tool. However, often the results can be improved if the selection is performed manually, in particular by a software-assisted selection. To this aim, finger painting on the touch-screen of the display device might be used to select the hair area, the face and (optionally also) a background area defined as "no-hair-areas". Instead of a finger painting, also a normal pointer or mouse device might be used. This processing is easy and intuitive for selecting the hair area by simply discriminating between hair, skin and background. In a preferred embodiment, the background, i.e. in particular all no-hair- and no-face- or no-skin-areas, are recognized automatically by the image processing software tool. This might be based on the selection of the hair and face areas such that the no-hair- and no-face areas are supposed to be background areas. In this embodiment there is no need for a manually marking the background in the still picture.

Selecting the hair area in the still picture and correlating the selected hair area with a specific color pattern.

After selection of the hair area in the still picture, the color differences between the hair area and the face area and optionally the background area might be analyzed by the image processing software tool to propose a specific color pattern of the hair area which is distinguished from the face and background areas.

Segmenting the entire hair area in each processed picture of the continuously collected pictures based on the specific color pattern and defining the hair piece for each processed picture.

Having performed the previous step during initialization of the process, the entire hair area is segmented for each of the processed pictures (comprising the still picture as well as the continuously collected pictures processed by the processing device). The segmentation is based on the specific color pattern, i.e. a certain color pattern range around the natural hair color is chosen and all pixels showing a color within this range are selected to segment the entire hair area. This might be supported by the image processing software tool such that pixels positioned far away from the pixels identified as hair pixels are not chosen and/or that the structure of the hairs is taken into account. After segmenting the entire hair area, the hair pieces for each processed picture (still picture as well as continuously collected pictures) are defined (or selected) while processing the continuously collected pictures one after the other or partially in parallel to increase the picture rate of the processed pictures ready for presentation.

Selecting a hair color determined by the user and applying the selected hair color to the defined hair pieces in the processed picture.

For the defined or selected hair piece, the original hair color might be warped into the desired hair color, in order to consider e.g. structural effects and the appearance of e.g. shadows in the image. The colorized hair piece might then simply be layered over the original image to show the picture of the model with the selected (new) hair color. In this process step, the selected color is thus applied to a "virtual" hair piece thereby coloring virtually the hair of the model.

Preparing the image to the characteristics of the used display device and presenting the processed image with the hair piece to which the selected hair color is applied on the display.

In this step, it is possible to adapt the resolution of the image to the resolution of the display. This step might also be used for adapting the new image of the model to the characteristics of the used display in order to achieve a realistic coloring of the image on the display. Accordingly, this step might also in particular include a color calibration of the image in order to achieve a normalized image presentation.

With the presentation of the processed image, the processing of each of the continuously collected pictures is finished.

According to a preferred aspect of the invention, the display processor of the display device might also be adapted—e.g. by a suited software installed on the display processor—to run an application performing at least a selection of the following functions:

Presenting continuously the pictures processed by the processing unit on the display device Presenting a start button for the hair color simulation on the display and sending a start signal to the processing unit upon actuation of the start button Presenting a hair color selection field on the display and sending the selected color value to the processing unit upon selection of a hair color by the user A hair color selection field might include a color preselection part, in which certain colors are offered to the user for a quick and intuitive selection. Beside some hair color categories, such as light blond/dark blond/red/brown/dark, it might comprise as well different profiles, such as male/female; spring/summer/autumn/winter; or self-defined profiles that enable a quick preselection and/or application of certain hair colors.

Presenting a color shades regulator, such as a slider a wheel, a chessboard-like grid, or any other suitable tool for adapting the color shades through a human machine interface (HMI) on the display and sending the selected color shade value to the processing unit upon selection of a shade by the user Saving images and displaying formerly saved images of users with natural and/or colorized hair on the display.

Taking pictures with the integrated cameras and providing these pictures to the system. These pictures may be used i.e. for whitepoint or brightness adjustment.

With these features, a powerful input and control panel is provided to the user which allows intuitive handling and is powerful in connection with the processing unit for processing the input parameters and for influencing the outcome of the processed pictures.

Though the processing unit and the display unit are described as separate units, it is clear to the one skilled in the art that the processing unit (in particular used by the image processing software tool) and the display unit might be combined in one single unit. A preferred embodiment includes the processing unit into a mobile display unit having the processor power to perform the image processing in a near real time manner.

In order to ease the handling of the hair consultation tool arrangement, it might be provided that the digital video camera and the illumination device are integrated into a camera support thereby defining an integrated arrangement of the illumination module and the video camera. In particular, the position of the light sources of the diffuse illumination module and the camera are fixed in an optimum way.

Further, a mirror and/or a display holder might be integrated into the camera support. Thus, if the preferably portable display device is held in the display holder, the camera support might be used as a conventional-like virtual mirror. This gives the opportunity that the customer might survey the effects of the color change while the hair stylist is styling the customers hair. Further, the display holder might be equipped with a charging unit to recharge the accumulator of the display device such that the display device is energized efficiently if taken out of the holder to have the benefit of the portable display holder and enabling a virtual 360° mirror.

According to a preferred embodiment, the hair consultation tool arrangement also includes a revolving chair or plateau—i.e. rotational devices—disposed in the focus of the video camera such that the model's head and hair are imaged in the pictures recorded by the video camera, the revolving chair or plateau allowing a free rotation of the model's head up to 360°, i.e. completely, and/or in certain degree steps, e.g. 45°, 60°, 90°, and so on to the left or the right while remaining disposed in focus of the video camera. By use of the revolving chair, a defined rotation of the model in front of the camera can be achieved. Accordingly, the revolving chair is defined as a device allowing preferably the model's head to turn around an axis running preferably through the head, and in particular through the center of the head. Thus, the model, and in particular the model's head and hair, will stay in focus of the digital video camera during the free rotation. Alternatively, the rotational device might also be a plateau onto which the model is standing. Alternatively, the model might turn around him/herself, while remaining disposed in the focus of said digital video camera.

In order to enhance the segmentation of the hair area with respect to the background, a defined background element might be disposed behind the model in view of the video camera, the background element having in particular one defined color (mono-colored background). A suited background is a blue or green background which is often used in the image processing technology to ease masking of a model in front of said background. Another option is to take a picture of the environment, e.g. a room or the background, before the customers appears. The content of this picture can be recognized as background (as long as it remains unchanged) while the customer is situated in the foreground.

The invention is further directed to a method for a hair consultation using the hair consultation tool arrangement as described before or parts thereof for a hair color consultation. The method comprises in particular the steps of:

Setting up and calibrating the illumination device and/or the video camera

Taking a still picture of the model and optionally calibrating the still picture Segmenting the hair area from the other image areas of the still picture Selecting the hair area in the still picture and correlating the selected hair area with a specific color pattern Segmenting the entire hair area in each processed picture of the continuously collected pictures based on the specific color pattern and defining the hair piece for each processed picture Selecting a hair color determined by the user and applying the selected hair color to the previously segmented hair piece Preparing the image to the characteristics of the used display device and presenting the processed image with the virtual hair mask Of course during these steps use of all other features described before can be made according to the invention, either of single features or any combination of the single features.

Further, the invention is directed to a computer program product implementing the before method on a processing unit that is part of a hair consultation tool arrangement or parts thereof as described before.

DETAILED DESCRIPTION OF THE INVENTION

Figure 1:
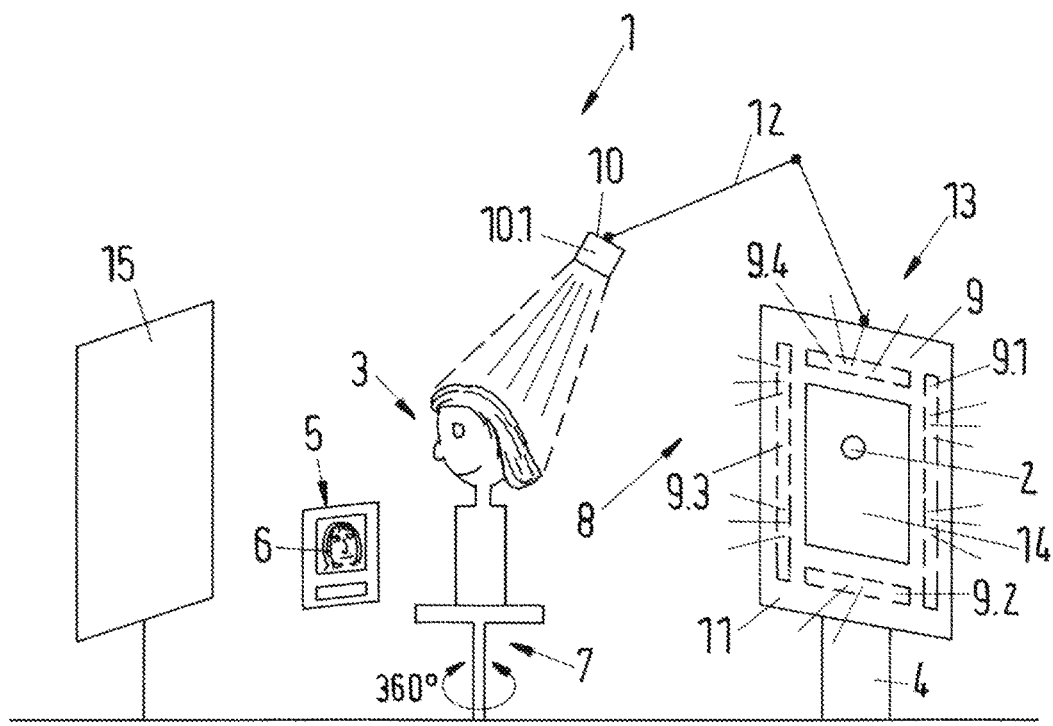
FIG. 1 shows a schematic three-dimensional view of the hair consultation tool arrangement according to a preferred embodiment of the invention.

In FIG. 1 a hair consultation tool arrangement 1 for use in a hair salon, beauty parlor, retail shop or even at home is shown comprising a digital video camera 2 adapted for continuously taking pictures of a model's head and hair 3. In the drawn example, the model 3 is an artificial mannequin. However, instead of an artificial mannequin, a living human being can be positioned of course as model 3 in front of the digital video camera 2 for taking pictures of the human being's head and hair. The hair consultation tool arrangement 1 comprises further a processing unit 4 having a camera interface for collecting pictures recorded by the digital video camera 2. In FIG. 1, the processing unit 4 is shown as a schematic box.

In the processing unit 4, a processor (not shown) is provided with an image processing software tool implemented for processing the pictures recorded by the video camera 2 and collected by the processing unit 4 via the camera interface. The processing unit 4 further has a display interface for sending the processed pictures 6 to a display device 5. The display device 5 is provided for presenting the processed pictures 6 to the customer and/or user being for example the model 3.

In the embodiment according to FIG. 1, the display device 5 is a portable display device 5 connected to the display interface of the processing unit 4 by means of a wireless communication such as WLAN, Bluetooth, or the like. Using this wireless communication, a data communication between the processing unit 4 and the display device 5 is implemented allowing for sending the processed pictures 6 from the processing unit 4 to the display device 5 and for transmitting user commands input into the portable display device 5 to the processing unit 4.

The model 3 is disposed on a revolving chair 7 (including a revolving plateau for disposing an artificial mannequin) allowing a up to 360° rotation of the revolving chair 7 such that the model's head and hair 3 are imaged in the pictures recorded by the video camera 2 in each rotational position of the revolving chair 7. Thus, a up to 360° image sequence of the model 3 can be processed.

As evident from FIG. 1, it is advantageous that the display device 5 is a portable display device 5, such as a tablet computer, which might be hold by a human being model 3 during rotation on the revolving chair 7. Thus, the model 3 can view his image recorded by the digital video camera 2 in real time as processed picture 6 on the display device 5 while rotating with the revolving chair 7.

Accordingly, the present invention creates a virtual mirror allowing—in contrast to a real mirror attached to the wall—also to display rear views of the head and hair of the model 3 in real time.

In order to create high quality real time pictures, the hair consultation tool arrangement 1 comprises further an illumination device 8 directed towards the model's head and hair 3 for illuminating the part of interest of the model 3 recorded by the digital video camera 2. The illumination device 8 comprises two different lighting modules 9 and 10, wherein the lighting module 9 is a diffuse light module and the lighting module 10 is a spotlight module.

The diffuse light module 9 creates a diffuse light and comprises in the example shown four light sources 9.1 to 9.4 built as elongated tubular fluorescent tubes. The light sources 9.1 to 9.4 of the diffuse light module 9 might be positioned in the same plane with the video camera 2 said plane being directed approximately perpendicular to the optical axis of the video camera according to a preferred embodiment. Preferably, the video camera 2 is positioned somewhere between all light sources 9.1 to 9.4 arranged to surround the digital video camera 2. This enhances the equal light intensity distribution of the light emitted by the diffuse light module 9 with respect to the view direction of the digital video camera 2 and the model 3.

The light sources might be direct light sources facing the model 3 directly (as shown in FIG. 1) or indirect light sources facing the model 3 indirectly using a reflecting surface such a foil, a mirror, a screen or the like (as not shown in the drawings).

In order to enhance the scattering of the light emitted by the light sources 9.1 to 9.4 of the diffuse light module 9, the light sources 9.1 to 9.4 might be covered by a diffuser 11 such as a translucent glass plate in front of the light sources 9.1 to 9.4.

As already explained, the diffuse light allows an optimum image segregation as the texture in the recorded images is high allowing the image processing software tool to precisely differentiate between different areas in the pictures.

However, as pictures recorded with a diffuse front light, i.e. light directed in the same direction as the optical axis of the digital video camera 2, are often considered as being boring due to a missing plasticity in the picture, another light source 10.1 of the spotlight module 10 is provided and disposed to light up the model's hair 3 with a spotlight. The light source can be adjustable to emit the spotlight in an angle between 0° and 90° with respect to the optical axis of the digital camera in any rotational position around the optical axis of the camera. To this aim, the spotlight module 10 might be fixed by a hinged bracket 12 to a camera support 13 including the digital video camera 2, the diffuse light module 9 with the diffusor 11, the spotlight module 10 with the hinged bracket 12, the processing unit 4 and a mirror 14 positioned somewhere within a frame defined by diffuse light sources 9.1 to 9.4 surrounding also the digital video camera 2. The mirror 14 might be a traditional glass mirror having a hole for the digital video camera 2, a semi-transparent mirror allowing the video camera 2 to record pictures through the semi-transparent mirror or a digital mirror, the latter being a display unit such as a computer screen, a TV screen or a movable tablet computer showing in real time the pictures recorded by the digital video camera 2.

Figure 3A:
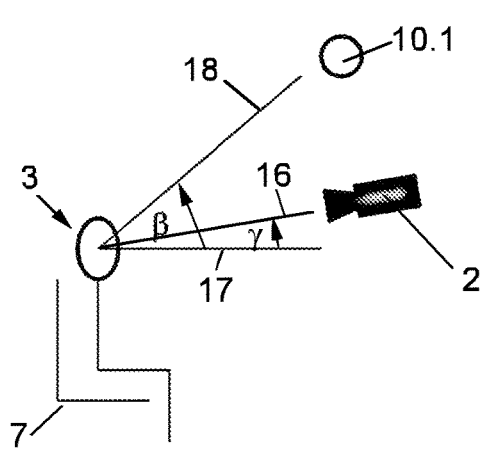
FIGS. 3a and b show a schematic view of the arrangement of the light source of the spotlight module with respect to the digital video camera and the models head and hair in a side view (FIG. 3a) and a top view (FIG. 3b).
Figure 3B:
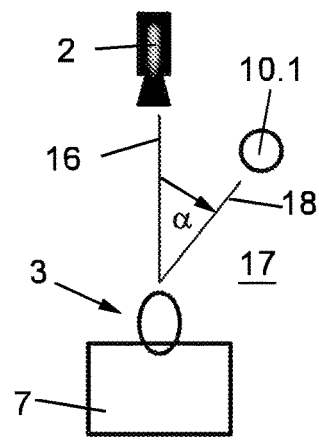
Figure 2:
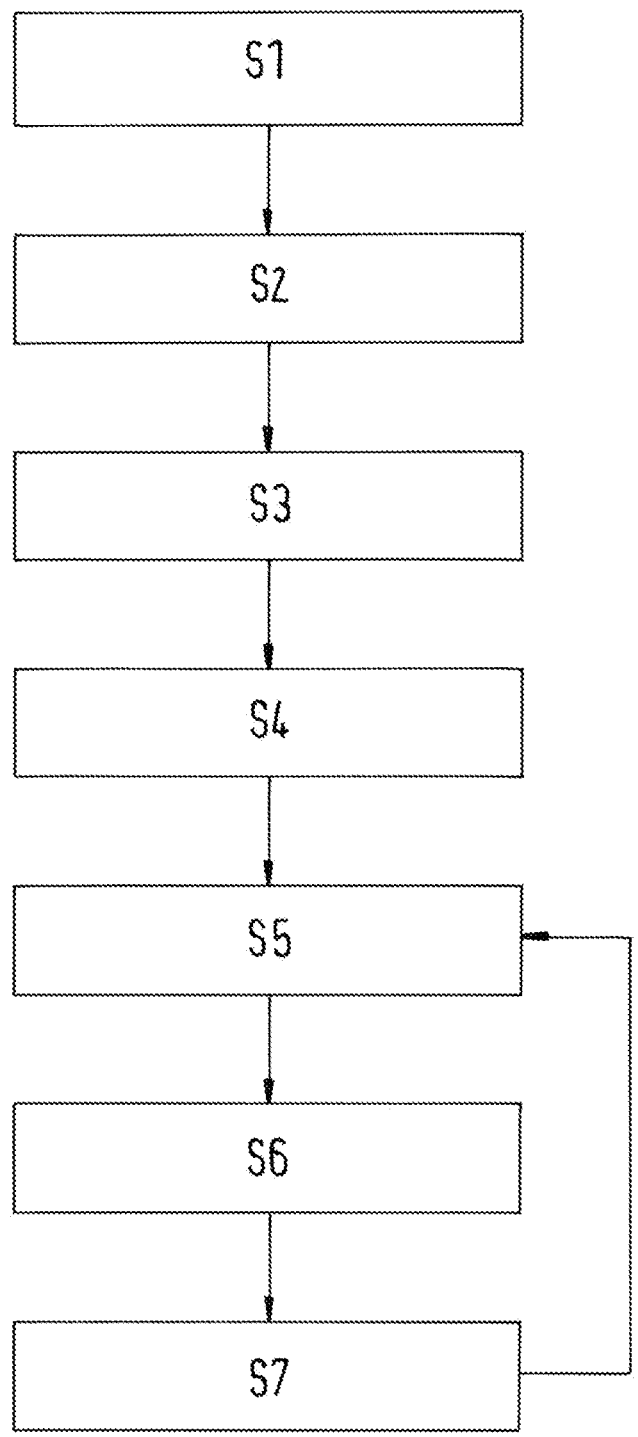
FIG. 2 shows a schematic sequence of a method for a hair color consultation performed by the hair consultation tool arrangement according to FIG. 1 as a flow chart.

With respect to FIGS. 3a and 3b, a preferred arrangement of the light source 10.1 of the spotlight module 10 is described with respect to the camera 2 and the model's 3 head and hair being the desired focal point. FIG. 3a shows a side view of the camera 2 and the model 3 seated on the revolving chair 7. The optical axis 16 is displayed between the camera 2 and the head of model 3.

The horizontal plane 17 running through the model's 3 head and hear, and in particular running also through the desired focal point, is disposed perpendicular to the paper plane. The camera 2 is disposed (in the azimuthal direction) between the horizontal plane 17 and the light source 10.1 of the spotlight module 10.

FIG. 3b is a view form the top to this horizontal plane 17, in which the polar angle $\alpha$ is defined (starting from the optical axis 16 or the vertical projection of the optical axis 16 into the horizontal plane 17).

The light axis 18 is defined as the middle axis of the light cone of the spotlight source 10.1 leading form the spotlight source 10.1 to the head of the model 3 and intersecting the optical axis 16 in the head of the model 3 (being the focal point of the camera 2). The azimuthal angle $\beta$ is defined as the angle between the light axis 18 and the horizontal plane 17. Counting of said angle $\beta$ starts in the horizontal plane 17 towards the space above the horizontal plane 17. This azimuthal angle $\beta$ is preferably in the range between 30° to 70°.

According to the position of the camera 2, the optical axis 16 of the camera 2 includes an azimuthal angle $\gamma$ with the horizontal plane 17. This azimuthal angle $\gamma$ is preferably in the range between 10° to 15°.

FIG. 3b shows the horizontal plane 17 from a top view. The light source 10.1, the light axis 18, the optical axis 16 of the camera 2, and the camera 2 lie out of this horizontal plane 17. The polar angle $\alpha$ is defined in this horizontal plane 17 as the angle between the vertical projection of the optical axis 16 and the vertical projection of the light axis 18 into the horizontal plane 17. In other words, the polar angle $\alpha$ is defined as the angle between a vertical plane including said optical axis 16 and a vertical plane including said light axis 18. Counting of said angle $\alpha$ starts at the optical axis 16, or their projection into the horizontal plane 17. The polar angle $\alpha$ is preferably in the range between −45° to +45°.

It is to be understood that the camera support 13 as described before is a preferred embodiment of the current invention. However, the different parts of the camera support 13 (video camera 2, diffuse light module 9, spotlight module 10, mirror 14, processing unit 4, etc.) can be separate parts arranged in a suitable manner to allow the before described functionality.

The light sources 9.1 to 9.4 and 10.1 might be controlled by the processing unit 4, i.e. for example be switched off and on and calibrated by means of the processing unit 4. Preferably, the light sources 9.1 to 9.4 of the diffuse light module 9 and the light source 10.1 of the spotlight module 10 are cold white lamps (approximately 4000K).

In the view direction of the digital camera 2, a mono-colored background 15 is optionally being disposed behind the model 3. The background color might be in particular blue or green for distinguishing the model 3 clearly from the background 15 and enhancing thus a creative power of the image processing software tool.

In the following, the process of hair consultation is described on basis of the preferred example of a hair color simulation. This process is mainly performed by the processor of the processing unit 4 in which suited software tools are implemented to perform the following steps. For a necessary user input, e.g. the display device 5 might be used. According to a preferred embodiment, the display device 5 is a portable display device, such as a tablet computer, with an application implemented on the display processor allowing user interaction and input in communication with the processing unit 4.

After switching on the system components of the hair consultation tool arrangement 1, in particular the digital video camera 2, the illumination device 8 the processing unit 4 and the display device 5, in a first step S1, the setup and calibration of the illumination device 8 and the video camera 2 are performed. Preferably, the model 3 is already positioned on the revolving chair 7 while performing the calibration steps. After change of the model 3, a respective calibration process might be performed again initiated e.g. by a respective user input on the portable display device 5.

During the calibration of the illumination source, the lighting is tested by the image processing software tool in order to ensure satisfactory hair segmentation, while the overall image is rendered real-like. To this aim, the image processing software tool might give a feedback to the illumination device 8 regarding the adjustment of intensity, color temperature and so on, to adjust the controllable light sources 9.1 to 9.4 and 10.1 of the different lighting modules 9, 10 until an optimum result of the recorded picture is obtained as defined by the image processing software tool. The processing software might as well adjust the camera settings to calibrate the image. Preferably the white point of the white point of the camera is set and the exposure time is adjusted. Further, modification of the aperture of the camera is possible.

For setting the white point, the color calibration can be done directly through adjusting thru the display device 5 held in front of camera display a standard white or grey color. The advantage is that the color calibration of the camera 2 includes the color calibration of the display device 5

Afterwards or in parallel, the exposure time of the video camera 2 is determined depending on the model's hair color for ensuring real-like rendering of the hair and a sufficient texture for the virtual color treatment of the hair to be performed in the further steps.

The following step S2 is a calibration of a still picture taken of the model 3. In this step, first a still picture is taken and calibrated by the image processing software tool in order to render a real-like image by selectively altering e.g. brightness of some areas of the face, e.g. the skin. For example, darkening of the skin leads often to a natural appearance of the picture. Further auto-adjusting tools can be applied to the recorded picture by the image processing software tool. The determined parameters for an optimum processed picture are stored and apply in the following to the continuously recorded pictures for creating a real time movie image. For example it is possible to decrease the brightness of the whole image after colorization of the hair area. The idea is to dispose of a brighter image for colorization obtaining more information within the hair area.

After calibrating the still picture, the still picture is displayed on the display device 5 for initiating the next process step S3 directed to the segmentation of the hair area. This step is preferably performed in interaction with the user being able to identify, e.g. by a manual selection using finger painting on a touch-screen display device 5, the hair areas from other areas of the image, such as skin and background. This might be performed by easily highlighting selectively the hair areas as well as the background areas by a finger painting on the still image displayed on the touch-screen and sending the information back to the processing unit 4. This is an easy and intuitive process for selecting the hair area allowing a simple discrimination between hair, skin and background.

This step S3 might be left out according to the invention if the system automatically recognizes any kind of hair and skin. Therefore the system is equipped with a library. This library might be "intelligent", learning from the performed cases.

In the next process step S4, the image processing software tool is selecting the complete hair area in the still picture and correlates this hair area with a specific color pattern. The color pattern is e.g. the rgb color space. The correlation might be performed by assigning certain color pattern values to the pixels being identified as pixels of the hair region.

For selecting the hair area, also tracking features of the face might be used as generally known in the image processing technology. Further masks might be used for spotting eyes, mouth, teeth and/or other parts of the face or background.

The segmentation of the entire hair area might be performed by creating a hair mask confined versus the other image areas. This hair mask is basically based on identifying the natural hair color pattern values and allowing a certain range of these color pattern values to select pixels showing hair in the image to be processed.

In the next process step S5, the entire hair area is segmented in each processed picture of the continuously collected pictures (including as first picture also of the still picture) based on the specific color pattern (i.e. the color pattern value range) and creating a virtual hair mask for each processed picture.

In the next step S6, a hair color selected by the user is applied to the virtual hair mask. In case, the user has not yet determined the wished for hair color, the user might be prompted on the display device 5 to select a certain color out of a color pattern displayed on the image device 5. The application of the selected hair color to the virtual hair is performed by the image processing software tool in the processing unit 4. The colorization of the hair piece might be performed by "warping" the histogram of the original hair to the histogram of a selected hair image. The hair is then layered over the original image.

The image resulting from S6 is then processed to be ready for displaying. This can include modification of brightness and gamma value and/or color correction with regard to the used display. It is also possible to just adopt the resolution of the image to the resolution of the display device.

After having processed the picture, the processed picture is send to the display device 5 for presenting an image of the model 3 with the virtual hair mask in the desired color (step S7).

After sending the processed image 6 to the display device 5, the processor of the processing unit 4 returns to step S5 and starts defining a new hair piece for the next picture to be processed.

The process continues until the user stops or switches off the hair consultation tool arrangement. This allows the model 3 to rotate the head while receiving a real time image of the view with the hair color changed to the hair color chosen by the user.

Of course, it is possible to store a still image or a movie composed of continuously stored processed images in order to share the processed images via a telecommunication network e.g. with a social network or to transmit the pictures by e-mail to the user. Pictures may also be stored in a data base to document the consultation and application process.

With the proposed hair consultation tool arrangement a powerful tool has been established to simulate the change of the hair color of a customer before the stylist colors the consumer and/or user's hair in real.

When the desired hair color has been selected, the tool according to the present invention can be used, optionally in conjunction with separate measurements of the models hair, with a system capable of creating the target hair color product to obtain the desired hair color, and optionally producing the target hair color product.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

LIST OF REFERENCE NUMERALS 1 hair consultation tool arrangement
2 digital video camera 3 model
4 processing unit
5 display device
6 processed picture
7 revolving chair or plateau
8 illumination device
9 lighting module, diffuse light module
9.x light source of the diffuse light module
10 lighting module, spotlight module
10.1 light source of the spotlight module
11 diffusor
12 hinged bracket
13 camera support
14 mirror
15 mono-colored background
16 optical axis between camera and model's hair and head
17 horizontal plane including the optical axis
18 light axis between spotlight module and model's hair and head
α polar angle between vertical projections of the optical axis and the light axis
β azimuthal angle between horizontal plane and light axis
γ azimuthal angle between horizontal plane and optical axis
S1 calibration of illumination and camera
S2 calibration of still picture
S3 segmentation of hair area
S4 correlating selected hair area with specific color pattern
S5 creation of virtual hair mask for each processed picture
S6 application of selected hair color to the virtual hair mask
S7 presenting processed image

What is claimed is:

1. A hair consultation tool arrangement comprising
a digital video camera adapted for continuously taking pictures of a model's head and hair,
a processing unit having a camera interface for collecting pictures recorded by the digital video camera,
a processor with an image processing software tool implemented for processing the collected pictures,
a display interface for sending the processed pictures to a display device, and a display device for presenting the processed pictures, and
an illumination device directed towards the model's head and hair for illuminating the part of the model imaged by the digital video camera,
said illumination device comprising at least two lighting modules, one of said two lighting modules being a diffuse light module creating a diffuse light and the other of said two lighting modules being a spotlight module creating a spotlight, characterized in that a light source of said spotlight module is disposed to light up the model with a spotlight, said light source being adjustable to emit the spot light cone in an angle between 0° and 90° with respect to the optical axis of said digital video camera, wherein a color temperature of the diffuse light module and a color temperature of the spotlight module are known by the image processing software, and
the processor of the processing unit is adapted to switch on both the illumination device and the video camera, calibrate an intensity and the color temperature of both the diffuse light module and the spotlight module, determining an exposure time of the video camera, and take a still picture of the model and calibrate the still picture, and
the processor is configured to segment a hair area of the model from the collected pictures based in part on the color temperature of the diffuse light module and the color temperature of the spotlight module; and said light source of the spotlight module being attached to hinged bracket which is fixed to a module carrying said digital video camera.

2. The hair consultation tool arrangement according to claim 1, characterized in that the light source of said spotlight module is adapted to emit said spot light cone with a light axis positioned in an azimuthal angle β between 30° and 70° measured between a horizontal plane running through the model's head and hair and said light axis leading from said light source to said model's head and hair.

3. The hair consultation tool arrangement according to claim 1, characterized in that a polar angle α a defined between a vertical plane including said optical axis and a vertical plane including said light axis is in a range between −45° or +45°.

4. The hair consultation tool arrangement according to claim 3, characterized in that the area transcribed by the spot light described as the sum of the range of the polar angles α and the azimuthal angles β, in which more than 50% of the light intensity are emitted, is less than 10' to 20°.

5. The hair consultation tool arrangement according to claim 1, characterized in that at least one light source of said diffuse light module is positioned in the same plane with said video camera.

6. The hair consultation tool arrangement according to claim 1, characterized in that said display device is a portable display device connected to the display interface of said processing unit.

7. The hair consultation tool arrangement according to claim 1, characterized in that a revolving chair or plateau disposed in a focus of said digital video camera such that the model's head and hair are imaged in the pictures recorded by said digital video camera, the revolving chair or plateau allowing a rotation of the model's head while remaining disposed in the focus of said digital video camera.

8. The hair consultation tool arrangement according to claim 1, characterized in that said digital video camera is a HDR camera using a high dynamic range method.

9. The hair consultation tool arrangement according to claim 1, characterized in that said display device comprises a display processor adapted to execute an application on said display device that is showing a processed image and allowing a user input to setup the system or influence the processed image using a input tool.

10. The hair consultation tool arrangement according to claim 9, characterized in that said input tool is a touch-screen display device allowing as a user input a finger painting on the image of a picture taken by said camera and displayed on said touch-screen for selecting hair and skin areas in the image.

11. The hair consultation tool arrangement according to claim 1, characterized in that said processing unit is adapted to perform a hair color simulation in which a hair color of the model's hair is amended by replacing an original hair color in said continuously collected pictures to a color determinable by a user input and to continuously present said processed pictures with the replaced hair color on said display device.

12. The hair consultation tool arrangement according to claim 11, characterized in that said processor of the processing unit is adapted to perform at least a selection of the following steps:
taking a still picture of the model and optionally calibrating the still picture;
segmenting the hair area from other image areas of the still picture;
selecting the hair area in the still picture and correlating the selected hair area with a specific color pattern;

segmenting the entire hair area in each processed picture of the continuously collected pictures based on the specific color pattern and defining a hair piece for each processed picture;

selecting a hair color determined by the user and applying the selected hair color to the hair piece;

preparing a processed image, including in particular a color calibrating of the characteristics of the used display device; and presenting the processed image with the hair piece to which the selected hair color is applied.

13. The hair consultation tool arrangement according to claim 9, characterized in that said display processor of said display device is adapted to run an application performing at least a selection of the following functions:

presenting, continuously, the pictures processed by the processing unit on the display;

presenting a start button for the hair color simulation on the display and sending a start signal to the processing unit upon actuation of the start button;

presenting a hair color selection field on the display and sending a hair color value to the processing unit upon selection of a hair color by the user; and presenting a color shades regulator on the display and sending a selected color shade value to the processing unit upon selection of a color shade by the user.

14. The hair consultation tool arrangement according to claim 11, characterized in that said display processor of said display device is adapted to run an application performing at least a selection of the following functions:

presenting continuously the pictures processed by the processing unit on the display;

presenting a start button for the hair color simulation on the display and sending a start signal to the processing unit upon actuation of the start button;

presenting a hair color selection field on the display and sending a hair color value to the processing unit upon selection of the hair color by the user;

presenting a color shades regulator on the display and sending a selected color shade value to the processing unit upon selection of a color shade by the user.

15. The hair consultation tool arrangement according to claim 1, characterized in that a defined background element is disposed in view of said digital video camera behind the model.

16. A method for a hair consultation using the hair consultation tool arrangement according to any one of the preceding claims, characterized in that the method includes the following steps:

setting up and calibrating a diffuse light module and a spotlight module and a video camera;

taking a still picture of a model and calibrating the still picture;

segmenting, on a processing unit of the hair consultation tool, a hair area from other image areas of the still picture to generate a processed picture, wherein a color temperature of the diffuse light module and a color temperature of the spotlight module are known by the processing unit, and the processing unit is configured to segment hair area of the model from the collected pictures based in part on the color temperature of the diffuse light module and the color temperature of the spotlight module;

receiving a selection of the hair area in the still picture and correlating the selected hair area with a specific color pattern;

segmenting the hair area in each picture of continuously collected pictures, on a processing unit of the hair consultation tool, based on the specific color pattern and defining a hair piece for each processed picture;

receiving a selection of a hair color determined by a user and applying the selected hair color to the hair piece;

preparing an image, on a processing unit of the hair consultation tool, based on the characteristics of a display device and presenting the image with the virtual hair piece.

17. The method according to claim 16, characterized in that the method includes at least a selection of the following steps:

presenting continuously the image on the display;

presenting a start button for the hair color simulation on the display and sending a start signal to the processing unit upon actuation of the start button;

presenting a hair color selection field on the display and sending a hair color value to the processing unit upon selection of a hair color by the user;

presenting a color shades regulator on the display and sending a selected color temperature value to the processing unit upon selection of a color temperature by the user.

18. A non-transitory computer program product having program code means which are stored in a computer-readable medium in order to carry out the method according to any one of the claim 16 or 17 if the computer program is carried on the hair consultation tool arrangement according to any one of the claims 1 to 15 having a processing unit with a processor.

19. The hair consultation tool arrangement of claim 1, wherein the processor of the processing unit is adapted to use an image processing software tool to recognize a backlighting situation in a picture collected by the digital video camera send a warning message to the display interface for being displayed on the display device.

20. The hair consultation tool arrangement of claim 1, wherein the arrangement is further equipped with a library for automatically recognizing both a hair type and a skin type of the model.

21. The hair consultation tool arrangement of claim 1, further including a semi-transparent mirror and wherein the digital video camera is positioned to record pictures through the semi-transparent mirror.

22. The hair consultation tool arrangement of claim 21, wherein the diffuse light module includes at least four light sources arranged around the semi-transparent mirror and in the same plane as the digital video camera.

* * * * *